United States Patent Office 2,919,659
Patented Jan. 5, 1960

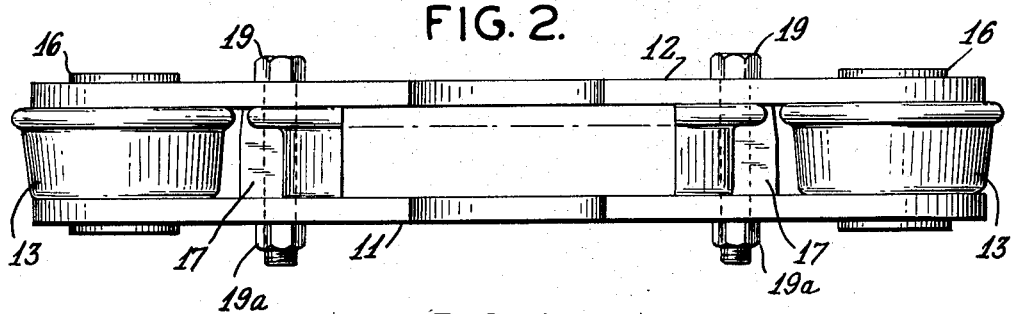
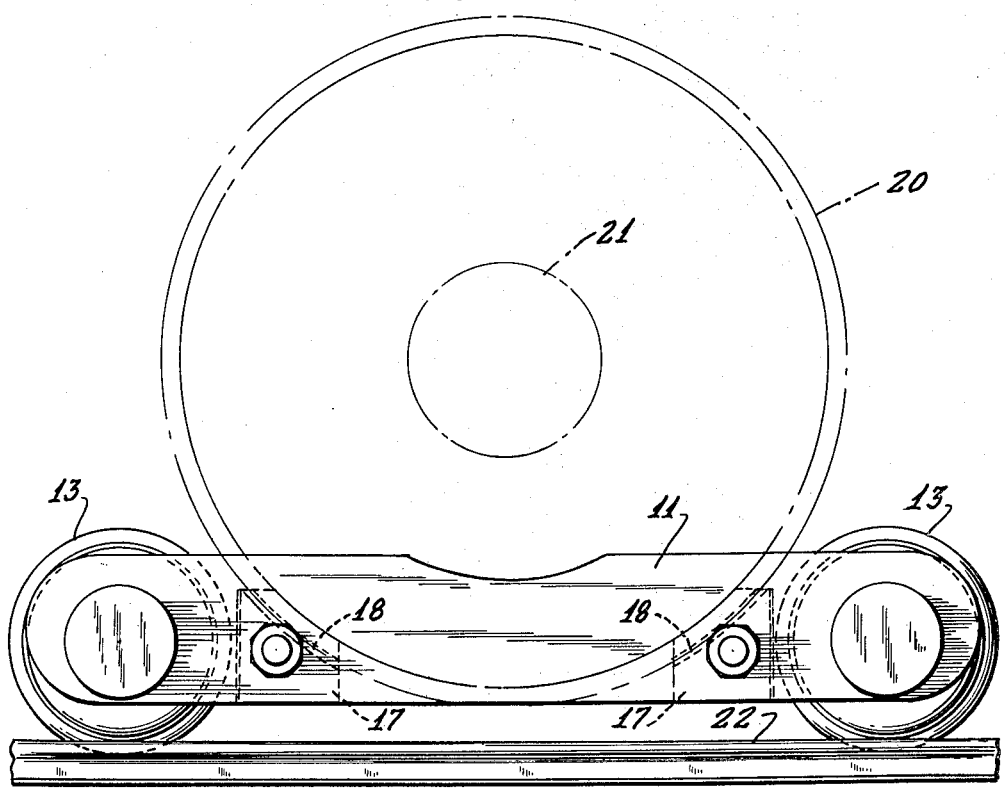
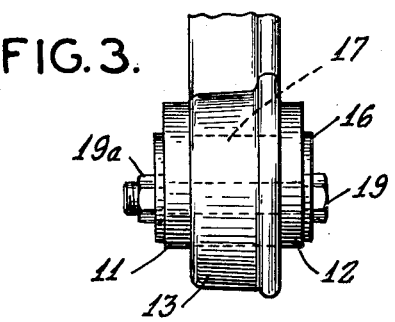

2,919,659

SKATE FOR MOVING RAILROAD EQUIPMENT

Rafael Grimany, Camaguey, Cuba

Application November 25, 1957, Serial No. 698,652

7 Claims. (Cl. 105—215)

This invention relates to a skate for supporting a wheel rigidly connected to a truck axle which has become locked either by failure of journal bearing or other causes.

More particularly it is the purpose of the present invention to provide a skate essentially adapted for supporting a wheel of a locomotive, rail-car, passenger coach, freight car and other types of rolling equipment above and out of an engagement with a rail and which skate is so constructed that it will support in a non-rotatable and clamped position the blocked wheel so that the car or locomotive may be self-propelled to a repair shop or other location where repair or replacement can be best accomplished.

Heretofore when a truck axle becomes blocked on a unit such as a locomotive or any other rolling equipment used by railroads, due to failure of journal bearing or other causes, the unit has been moved by sliding the wheels on the track wheels to the nearest siding or terminal. The result of such an action causes considerable damage to the wheels as well as associated equipment. In the alternative, it has also been the practice to have the blocked axle or the entire truck unit removed by lifting the unit with wrecker cranes which are brought to the location of the defective unit. Then the necessary repairs are made on-the-spot involving heavy expenses and delays to the scheduled movement of trains. Various relatively complicated devices to eliminate these have been proposed but by present practices are found to be inadequate. There has thus been manifest for a substantial time, a need in the industry for a practical solution.

The principal objects of the present invention are to provide a wheel skate which is simple to construct and use and yet performs the function of providing mobility to large and heavy rolling equipment when an axle and wheel are locked or otherwise rendered inoperative thereby obviating the need of wrecker cranes and costly on-the-spot repairs.

A skate made according to the invention comprises a pair of elongated plates, two rotatable wheels journaled between the plates at the end portions of the plates, and a pair of matching pivotal support blocks symmetrically located between the plates intermediate the wheels. The blocks are each mounted on threaded bolts which extend through the outside plate and are equipped with a draw up nut to tighten the whole assembly and cause it to frictionally engage the locked wheel.

The locked wheel or its truck axle of a locomotive or the like is raised for clearance above and out of engagement with a railroad rail on which it has been resting by any well known means such as a hand operated jack. The skate is then guided under the wheel after removing one of the rotatable wheels and the adjacent blocks. The plates act as guides and the remaining block acts as a stop for the mechanic in the operation of placing the skate under the wheel. The removed block and wheel are thereafter fastened into place and the jack lowered and removed. The wheel upon being lowered automatically adjusts itself to a centered and balanced position on the skate by the pivotal action of the blocks and movement of the skate on the rail. The locomotive may then be towed or rolled under its own power by disengaging any driving mechanism connected to the axle or other source of power transmission and utilizing the remaining unlocked driving axles for the impelling power. The locomotive may thus be moved to the nearest repair station at a reduced speed but with a minimum loss of time and effort.

In practice, when there is a connection between the axle and two or more wheels, a locked wheel will result in other wheels attached to the same axle being rendered nonrotatable. Accordingly, in order to move the locomotive under such a condition, a skate must be placed under all of the locked wheels.

Because of the low center of gravity of the skate with respect to the rail head when the skate is in place, a minimum of deflection strain to the reflex (i.e. springs, etc.) mechanism of the truck obtains.

Various other objects and advantages of the invention will be more fully appreciated from the following description of the drawing illustrating a preferred embodiment thereof.

In the drawing:

Fig. 1 is a side elevation view of the skate;

Fig. 2 is a top plan view of the skate; and

Fig. 3 is a right end view of the skate.

The embodiment of the invention chosen for the purpose of illustration comprises an outer side plate 11, and an inner side plate 12, a pair of rotatable railroad type wheels 13, and a pair of mirror-imaged support blocks 17.

The side plates 11 and 12 are substantially identical in shape being generally elongated and provided with holes for mounting the wheels and blocks.

The wheels 13 are constructed in accordance with accepted railroad practice and advantageously are provided with a suitable American Association of Railroads standard tread and flange shape, the dimensions of which being selected for use with different types of locomotive, rail cars and other units of railroad rolling equipment as desired. The diameter of wheels 13 are as large as commensurate with the type of rolling stock for which it is to be used. Although the size of the wheel is not critical, it is to be appreciated that the smaller the diameter the less will be the practical movable speed while the larger the diameter of the wheel, the more limited is the use of the skate for railroad stock having inaccessible truck structures. The width of the wheels 13 should be slightly less than the width of thickness of the blocked truck wheel which is to be supported by the skate in order to prevent the wheels 13 from binding after the skate has been mounted under and clamped to the wheel.

Wheels 13 are journaled between side plates 11 and 12 near the remote ends thereof and transversely to the longitudinal axes of the plates. Any suitable means shown generally as 16 may be provided for mounting the wheels 13, for example, a nut and bolt, provided that the mounting means lends itself for easy removal of the wheels from the plates. For structural strength and for a low centre of gravity, the axes of the mounting centers of the wheels 13 are advantageously located in the lower longitudinal half of the side plates. The dimension of the axes of wheels 13 above the bottom edge of side plates 11 and 12 is a matter of choice, but is limited by the requirement of minimum clearance above the rail heads.

The support block 17 is generally rectangular in shape, one corner of which is provided with a straight bevel 18. The beveled corner is preferably straight rather than curved. At best, only a compromise of the radius of curvature obtains for a curved bevel 18 to best support a variety of different sized wheels commonly used today. It has been discovered that the beveled edge 18 may be straight without affecting the support action. The attendant advantage of the straight bevels allows for a simple machining operation in the manufacture of the block rather than the more expensive machining operation required to provide curved contoured surfaces. Because most standard railroad wheels vary between 33 and 40 inches in diameter, it has been found that such a straight edge bevel is satisfactory. A substantial portion of the surface 18 is contiguous with the peripheral tread portion of the wheel. The thickness of support block 17 may be less or equal to, but not greater than the thickness of the wheel to be supported.

Each block 17 is provided with a cleared hole for pivotal mounting of the bolt 19 inserted therein through appropriate holes provided in each side plate 11 and 12. A nut 19a is threadably connected to the bolt 19 on the outside of the outer plate 11 for easy accessibility.

In operation, when a locomotive or the like having a wheel 20 attached to an axle 21, which may be a component of a multiple axle truck, becomes locked by failure of a journal bearing or other causes, the locked axle truck is raised by portable jacks so as to disengage the wheel from the rail head 22 upon which it has been resting and to provide sufficient clearance for the skates to be inserted thereunder. Since the axle is rigidly connected to two or more wheels 20, it is necessary to use two of the described skates so that the axle truck will be maintained in a horizontal position.

In operation, the mechanic will remove from an assembled skate one of the wheels 13 from between the side plates 11 and 12 and the associated block 17, together with its bolt 19 and nut 19a. The remaining bolt and nut 19 and 19a are loosened sufficiently so that the side plates 11 and 12 are loosely coupled thereto. The skate is placed on the track 22 so that the flange of wheel 13 and side plate 12 face inwardly between the pair of rails, in other words, in a position corresponding to the locked wheel. The side plates 11 and 12 are guided along the raised wheel 20, and until the remaining block 17 prevents by stop action the continued movement of the skate. No further adjustment or guidance is necessary by the mechanic for proper alignment of wheel 20 with respect to the skate. The removed block 17 is mounted in position and the removed wheel 13 is journaled into position. The nuts 19a are tightened sufficiently as to not prevent pivotal movement of the blocks 17 about the bolt 19. The jacks are lowered from beneath the truck axle 21 allowing the wheel and weight of the truck to symmetrically align itself against and between the beveled surfaces 18 and between the inner walls of the side plates 11 and 12. The nuts 19a may thereafter be tightened to provide clamping action of the walls of the wheels 20 thereby providing a rigid, non-rotatable mount for the wheel 20. Coupling means, (not shown) usually electric cable, propeller shafts, gears or fluid is either cut off by properly disconnecting the source of power from the locked axle as the case requires, thereby allowing the remaining motors or transmission to propel the unit under its own power to a terminal or switching point as desired, at a reduced speed.

Variations, modifications and changes are contemplated and may obviously be resorted to without departing from the spirit or scope of the invention which is defined hereafter.

I claim:

1. A carrier for a wheel comprising a pair of parallel elongated clamping plates adapted to clamp the lower side walls of said wheel therebetween, and being sufficiently elongated as to extend beyond the periphery of the wheel in the clamping position, a pair of support blocks pivotally connected to said plates between said plates and adapted to engage a lower peripheral portion of said wheel, two wheels with axles rotatably connected transversely to said plates between said plates at extreme ends thereof, said rotatable wheels having a peripheral portion extending below said plates for rolling movement along a flat surface, and means for clamping said clamping plates in clamped position on said wheel whereby said wheel is held between said plates while resting on said pivotal blocks.

2. A carrier according to claim 1, wherein each of said blocks is provided with a flat portion to engage said peripheral portion of said wheel, said blocks being spaced to support wheels of different diameters, the pivoting action of said blocks thereby providing a symmetrical self-positioning of any of said wheels of different diameters on said blocks when lowered thereon.

3. A carrier according to claim 1, wherein at least one of said rotatable wheels and its adjacent block are adapted for removal from between said plates.

4. A locomotive or railroad car wheel supporting skate comprising a pair of parallel elongated plates adapted to clamp the lower side walls of said wheel therebetween, two rotatable wheels, each of said rotatable wheels having axles journaled with and between said plates near the respective ends of said plates, a pair of pivotal blocks symmetrically disposed between said plates and intermediate said rotatable wheels, said pivotal blocks being pivotally connected to said plates below the line joining the centers of said rotatable wheels and adapted to support a wheel placed thereon along a peripheral portion thereof, and adjustable nut and bolt means through said blocks and plates to clamp a supported wheel resting on said blocks between said plates.

5. A locomotive or railroad car wheel supporting skate comprising a pair of elongated plates having a length at least as long as the diameter of a wheel to be supported, two rotatable wheels journaled between said plates in longitudinally spaced relation to one another, the axles of said rotatable wheels being journaled transversely with said plates, said rotatable wheels having peripheral portions extending below the plates and adapted to engage the tread portion of a rail head for mounting the skate for rolling movement along said rail head, two support blocks symmetrically disposed between said wheels being pivotally connected to said plates between said plates and adapted to engage a peripheral portion of the wheel to be supported, and means including said plates for clamping a supported wheel between said plates while said wheel is resting on said pivotal blocks.

6. A skate according to claim 5 wherein the pivotal mounting centers of said blocks are below the line joining the axes of said two rotatable wheels.

7. A skate for supporting during movement of a locomotive or the like a wheel rigidly connected to an axle of a truck of said locomotive which has become blocked comprising two parallel elongated plates adapted to clamp the lower side walls of said wheel therebetween, two rotatable and removable wheels journaled between said plates in longitudinally spaced relation to one another, the axles of said removable wheels being journaled transversely with said plates, said rotatable wheels having a flange and tread for engaging the tread of a rail head for mounting the skate thereon for rolling movement thereover, said rotatable wheels having a thickness less than the truck wheel of the locomotive for non-binding rotatable motion, said rotatable wheels having peripheral portions extending below the plates, said rotatable wheels having a diameter less than the diameter of said truck wheel, two support blocks symmetrically disposed between said plates intermediate said rotatable wheels, and adjustable nut and bolt means through said blocks and plates for providing pivotal action of the blocks whereby a supported wheel is symmetrically self-positioned on said blocks when lowered thereon, each of said blocks being generally square having one corner with a non-contoured bevel upon which a peripheral portion of the support wheel rests.

References Cited in the file of this patent

UNITED STATES PATENTS

| | | |
|---|---|---|
| 1,206,994 | Craigmile | Dec. 5, 1916 |
| 2,491,034 | Couch | Dec. 13, 1949 |
| 2,707,443 | Pope et al. | May 3, 1955 |